United States Patent
Munukutla et al.

(10) Patent No.: US 12,432,792 B2
(45) Date of Patent: Sep. 30, 2025

(54) SYSTEMS, METHODS, AND DEVICES FOR LATENCY PARAMETER-BASED COEXISTENCE ENHANCEMENT IN WIRELESS DEVICES

(71) Applicant: Cypress Semiconductor Corporation, San Jose, CA (US)

(72) Inventors: Sandeep Sarma Munukutla, Bangalore (IN); Raghavendra Kencharla, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 430 days.

(21) Appl. No.: 17/968,881

(22) Filed: Oct. 19, 2022

(65) Prior Publication Data
US 2024/0137993 A1    Apr. 25, 2024
US 2024/0237085 A9    Jul. 11, 2024

(51) Int. Cl.
*H04W 76/10* (2018.01)
*H04L 43/0864* (2022.01)

(52) U.S. Cl.
CPC ......... *H04W 76/10* (2018.02); *H04L 43/0864* (2013.01)

(58) Field of Classification Search
CPC ............................ H04W 76/10; H04L 43/0864
USPC ......................................................... 370/252
See application file for complete search history.

(56) References Cited

U.S. PATENT DOCUMENTS

| | | | | |
|---|---|---|---|---|
| 2012/0023236 | A1* | 1/2012 | Backholm | H04L 67/566 709/226 |
| 2012/0131095 | A1* | 5/2012 | Luna | H04L 69/28 709/224 |
| 2013/0016635 | A1* | 1/2013 | Linsky | H04W 72/1215 370/280 |
| 2013/0067063 | A1* | 3/2013 | Vasseur | H04L 45/026 709/224 |
| 2015/0006666 | A1* | 1/2015 | Backholm | H04L 67/1095 709/213 |
| 2018/0270137 | A1* | 9/2018 | Ganster | H04L 67/125 |
| 2021/0385147 | A1* | 12/2021 | Cohen | H04L 43/103 |

* cited by examiner

*Primary Examiner* — Nicholas R Taylor
*Assistant Examiner* — Chong G Kim (57) ABSTRACT

Systems, methods, and devices implement coexistence enhancement for collocated wireless transceivers. Methods include determining, using a processing device, a latency parameter associated with a wireless device comprising a first transceiver compatible with a first communications protocol and a second transceiver compatible with a second communications protocol. Methods also include identifying, using the processing device, a number of anchor points based, at least in part, on the latency parameter, each of the anchor points representing a periodic connection event for the second transceiver. Methods further include updating a radio frequency (RF) active signal to skip at least one transmit operation and receive operation of the second transceiver based on the identified number of anchor points.

20 Claims, 7 Drawing Sheets

SYSTEMS, METHODS, AND DEVICES FOR LATENCY PARAMETER-BASED COEXISTENCE ENHANCEMENT IN WIRELESS DEVICES

TECHNICAL FIELD

This disclosure generally relates to wireless devices, and more specifically, to coexistence enhancement in such wireless devices.

BACKGROUND

Wireless devices may communicate with each other via one or more wireless modalities, such as a Wi-Fi connection or a Bluetooth connection. Accordingly, such wireless communication may be implemented in a manner compliant with a wireless protocol. Moreover, such wireless devices may include various hardware components to facilitate such communication. For example, wireless devices may include transmission media that may include one or more antennas. Conventional techniques for handling activity of collocated wireless radios remain limited because they are not able to efficiently utilize such transmission media without wasting transmission time and power on unnecessary transmit and receive operations.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices that include collocated transceivers often must share access to a communications medium. Accordingly, coexistence operations must be performed to ensure the collocated transceivers may use the communications medium while avoiding contention. For example, a wireless device may include a Bluetooth-Wi-Fi combination chip that has a transceiver for each. A Bluetooth transceiver, such as a Bluetooth Low Energy transceiver, may have a periodicity defined by the Bluetooth specification itself, and such periodicity may be relatively frequent, such as every 7.5 milliseconds. When polling and null operations associated with such periodicity are not necessary, it results in inefficient allocation of the communications medium as well as wasted energy on unnecessary transmit and receive operations performed by the Bluetooth transceiver in this example. This problem is further exacerbated in the context of wireless devices that have smaller form factors and lower power constraints which may use time-division multiple access for communications medium allocation.

Embodiments disclosed herein provide the ability to leverage latency information and estimated connection metrics to reduce a number of unnecessary polling and null operations performed. As will be discussed in greater detail below, a latency parameter and estimated connection metrics may be used to dynamically identify a number of anchor points that may be skipped by a wireless device. More specifically, a latency parameter determined during connection establishment may be used alone or in combination with estimated connection metrics for channels used for communications events to intelligently determine which anchor points can be skipped and which cannot. In this way, latency parameter information as well as connection metrics may be leveraged to reduce a number of unnecessary transmit and receive operations performed by a transceiver, and thus improve efficiency of communications medium allocation and power consumption of wireless devices which may be operating in a power sensitive low-energy context.

Figure 1:
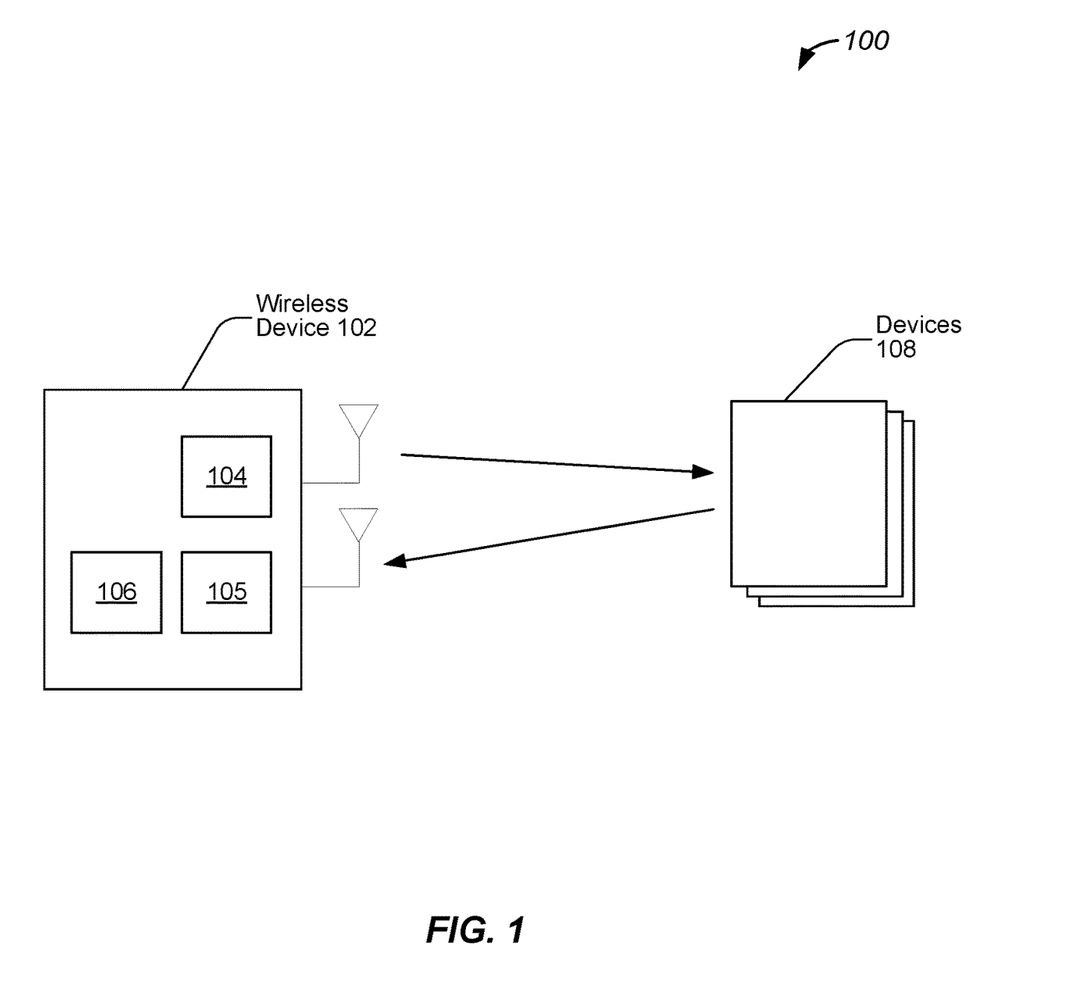
FIG. 1 illustrates an example of a system for coexistence enhancement, configured in accordance with some embodiments.

FIG. 1 illustrates an example of a system for coexistence enhancement, configured in accordance with some embodiments. As discussed above, various wireless communications devices may communicate with each other via one or more wireless communications media. For example, wireless communications devices may communicate with each other via a Wi-Fi connection or a Bluetooth connection. In various embodiments, the wireless communications devices may first establish connections or communications links before data transfer occurs. As will be discussed in greater detail below, wireless communications devices disclosed herein and systems, such as system 100, that implement such wireless communications devices are configured to improve performance of collocated transceivers and improve coexistence between their respective communications operations. More specifically, embodiments disclosed herein enable the usage of connection metrics and latency parameters to dynamically modify durations to medium access grants to respective transceivers thus increasing the overall efficiency of the usage of the communications medium.

In various embodiments, system 100 may include wireless device 102 which may be a wireless communications device. As discussed above, such wireless devices may be compatible with one or more wireless transmission protocols, such as a Wi-Fi protocol or a Bluetooth protocol. In some embodiments, wireless device 102 includes collocated radios. For example, wireless device 102 may include a Wi-Fi radio and a Bluetooth radio that share access to a communications medium. In one example, are Bluetooth devices. For example, wireless device 102 may be include a first transceiver, such as transceiver 104, and a second transceiver, such as transceiver 105. Transceiver 104 may be compatible with a Wi-Fi specification and protocol, and transceiver 105 may be compatible with a Bluetooth specification and protocol. In some embodiments, the Bluetooth protocol may be a Bluetooth Low Energy (BLE) protocol, also referred to as Bluetooth Smart. As will be discussed in greater detail below, wireless device 102 may be a component of a gaming system. For example, wireless device 102 may be included in a gaming console. In various embodiments, wireless device 102 may be a smart device, such as those found in wearable devices, or may be a monitoring device, such as those found in smart buildings, environmental monitoring, and energy management. It will be appreciated that such wireless devices may be any suitable device, such as those found in cars, other vehicles, and even medical implants.

As shown in FIG. 1, various wireless communications devices may be in communication with each other via one or more wireless communications mediums. Moreover, wireless device 102 may each include one or more antennas, and may also include processing device 106. As discussed above, wireless device 102 may also include collocated transceivers, such as transceiver 104 and transceiver 105. As disclosed herein a transceiver as well as its associated transmit and receive chains and processing logic may be referred to as a radio. As will be discussed in greater detail below, such processing devices, transceivers, and radios may be configured to establish communications connections with other devices, and transmit data in the form of data packets via such communications connections. Accordingly, wireless devices, such as wireless device 102, are configured to enable the usage of connection metrics and latency parameters to dynamically modify durations to medium access grants, as disclosed herein.

In some embodiments, system 100 may further include devices 108 which may also be wireless communications devices. As similarly discussed above, devices 108 may be compatible with one or more wireless transmission protocols, such as a Wi-Fi protocol or a Bluetooth protocol. In some embodiments, devices 108 may be slave devices in communication with wireless device 102. For example, devices 108 may be smart devices or other devices, such as those found in gaming systems, cars, other vehicles, and medical implants. In various embodiments, devices 108 may be different types of devices than wireless device 102. As discussed above, each of devices 108 may include one or more antennas, as well as processing devices and transceivers, which may also be configured to establish communications connections with other devices, and transmit data in the form of data packets via such communications connections. As discussed above, devices 108 may also be configured to enable the usage of connection metrics and latency parameters to dynamically modify durations to medium access grants, as disclosed herein.

Figure 2:
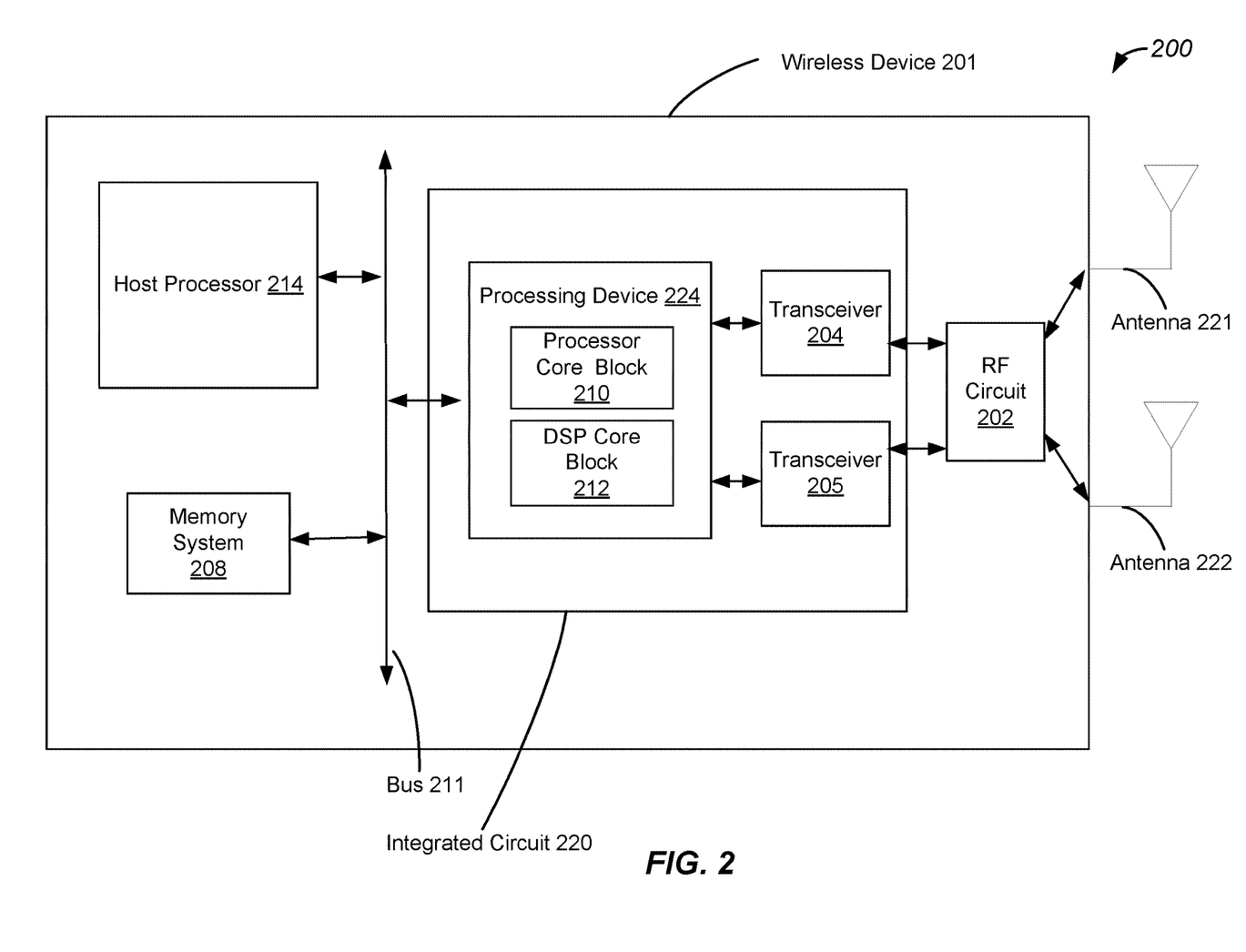
FIG. 2 illustrates an example of a device for coexistence enhancement, configured in accordance with some embodiments.

FIG. 2 illustrates an example of a device for coexistence enhancement, configured in accordance with some embodiments. More specifically, FIG. 2 illustrates an example of a system, such as system 200, that may include wireless communications device 201. It will be appreciated that wireless communications device 201 may be one of any of wireless device 102 or devices 108 discussed above. In various embodiments, wireless communications device 201 includes collocated transceivers, such as transceiver 204 and transceiver 205, which may be transceivers such as transceivers 104 and 105 discussed above. In one example, system 200 includes transceiver 204 and transceiver 205 which are configured to transmit and receive signals using a communications medium that may include antennas such as antenna 221 and antenna 222. In some embodiments, transceiver 204 may be compatible with a Wi-Fi protocol, such as an 802.11ax protocol. While embodiments disclosed herein describe Wi-Fi protocols, it will be appreciated that any suitable protocol or standard may be supported. For example, transceiver 204 may be compatible with any IEEE 802.11 standard or other IEEE 802.15.4 standards, such as Zigbee and Thread®. Moreover, transceiver 205 may be included in a Bluetooth radio, and may be compatible with a Bluetooth Low Energy communications protocol. Accordingly, transceiver 204 and transceiver 205 may each include components, such as a modulator and demodulator as well as one or more buffers and filters, that are configured to generate and receive signals via antenna 221 and/or antenna 222.

In various embodiments, system 200 further includes processing device 224 which may include logic implemented using processing elements and/or one or more processor cores. Accordingly, processing device 224 is configured to implement coexistence computation operations, as will be discussed in greater detail below. In various embodiments, processing device 224 includes one or more processing devices comprising processing elements that are configured to implement coexistence computation operations that will be described in greater detail below. In various embodiments, processing device 224 includes one or more components configured to implement a medium access control (MAC) layer that is configured to control hardware associated with a wireless transmission medium, such as that associated with a Wi-Fi transmission medium. In one example, processing device 224 may include processor core block 210 that may be configured to implement a driver, such as a Bluetooth and/or Wi-Fi driver. Processing device 224 may further include digital signal processor (DSP) core block 212 which may be configured to include microcode.

In various embodiments, processor core block 210 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack includes layers for a Bluetooth network encapsulation protocol, radio frequency communication, service discovery protocol, as well as various other high level data layers. Moreover, a controller stack includes a link management protocol, a host controller interface, a link layer which may be a low energy link layer, as well as various other timing critical layers.

System 200 further includes radio frequency (RF) circuit 202 which is coupled to antenna 221 and antenna 222. In various embodiments, RF circuit 202 may include various components such as an RF switch, a diplexer, and a filter. While FIG. 2 illustrates system 200 as having two antennas, it will be appreciated that system 200 may have a single antenna, or any suitable number of antennas. Accordingly, RF circuit 202 may be configured to select an antenna for transmission/reception, and may be configured to provide coupling between the selected antenna, such as antenna 221, and other components of system 200 via a bus, such as bus 211. While one RF circuit is shown, it will be appreciated that wireless communications device 201 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth.

System 200 includes memory system 208 which is configured to store one or more data values associated with coexistence computation operations discussed in greater detail below. Accordingly, memory system 208 includes storage device, which may be a non-volatile random access memory (NVRAM) configured to store such data values, and may also include a cache that is configured to provide a local cache. In various embodiments, system 200 further includes host processor 214 which is configured to implement processing operations implemented by system 200.

It will be appreciated that one or more of the above-described components may be implemented on a single chip, or on different chips. For example, transceiver 204, transceiver 205, and processing device 224 may be implemented on the same integrated circuit chip, such as integrated circuit chip 220. In another example, transceiver 204, transceiver 205, and processing device 224 may each be implemented on their own chip, and thus may be disposed separately as a multi-chip module or on a common substrate such as a printed circuit board (PCB). It will also be appreciated that components of system 200 may be implemented in the context of a low energy device, a smart device, or a vehicle such as an automobile. Accordingly, some components, such as integrated chip 220, may be implemented in a first location, while other components, such as antenna 221, may be implemented in second location, and coupling between the two may be implemented via a coupler such as RF circuit 202.

Figure 3:
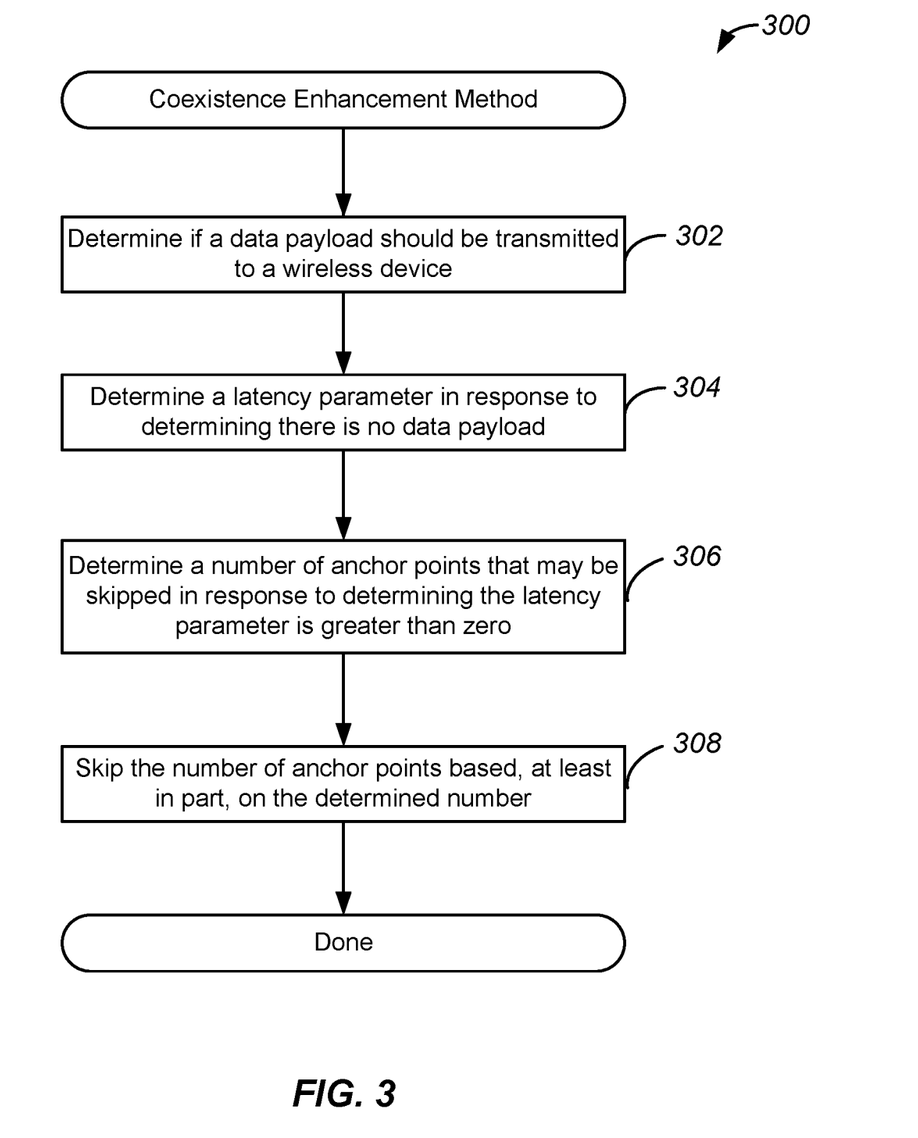
FIG. 3 illustrates an example of a method for coexistence enhancement, implemented in accordance with some embodiments.

FIG. 3 illustrates an example of a method for coexistence enhancement, implemented in accordance with some embodiments. As discussed above, various wireless devices may communicate with each other via a Wi-Fi connection and/or a Bluetooth connection. As will be discussed in greater detail below, wireless devices are configured to improve performance of collocated transceivers and improve coexistence between their respective communications operations. Accordingly, a method, such as method 300, may be performed to use connection metrics and latency parameters to dynamically modify durations to medium access grants to respective transceivers thus increasing the overall efficiency of the usage of the communications medium.

Method 300 may perform operation 302 during which it may be determined if a data payload should be transmitted to a wireless device. In various embodiments, such a determination may be made based on whether or not a data packet to be transmitted includes a data payload. For example, particular types of data packets may include data payloads for transmission, whereas other types of data packets, as may be identified by a header, do not include data payloads and may be used for other operations, such as polling operations. In one example, such a determination may be determined based on a bit identifying a status of a signal, such as an RF active signal used by a transceiver to request medium access. Accordingly, during operation 302, a wireless device may determine if a data payload is present and is to be transmitted.

Method 300 may perform operation 304 during which a latency parameter may be determined in response to determining that there is no data payload. Accordingly, if it is determined that no data payload is present, a latency parameter may be identified and retrieved. Such a latency parameter may have been determined during connection establishment between the wireless device and another wireless device. Accordingly, the latency parameter may be negotiated between the wireless devices in the communications link during connection establishment, and may be determined in accordance with a communications protocol. Additional details regarding the determination of the latency parameter are discussed in greater detail below with reference to FIG. 4.

Method 300 may perform operation 306 during which a number of anchor points may be determined in response to determining that a latency parameter is greater than zero. In various embodiments, anchor points may define a periodic implementation of operations associated with one of the transceivers. For example, anchor points may be associated with polling operations of a second transceiver that may be a Bluetooth transceiver. In various embodiments, a wireless device may identify, based on the latency parameter, a number of anchor points and associated polling operations that may be skipped. More specifically, if the latency parameter is greater than zero, the wireless device may identify a number of anchor points that may be skipped based on, among other things, one or more connection metrics.

Method 300 may perform operation 308 during which the number of anchor points may be skipped. Accordingly, the wireless device may skip a number of upcoming polling operations associated with the skipped anchor points in accordance with the determined number. In this way, superfluous medium access grant requests and operations may be avoided, thus improving efficiency of the usage of the communications medium.

Figure 4:
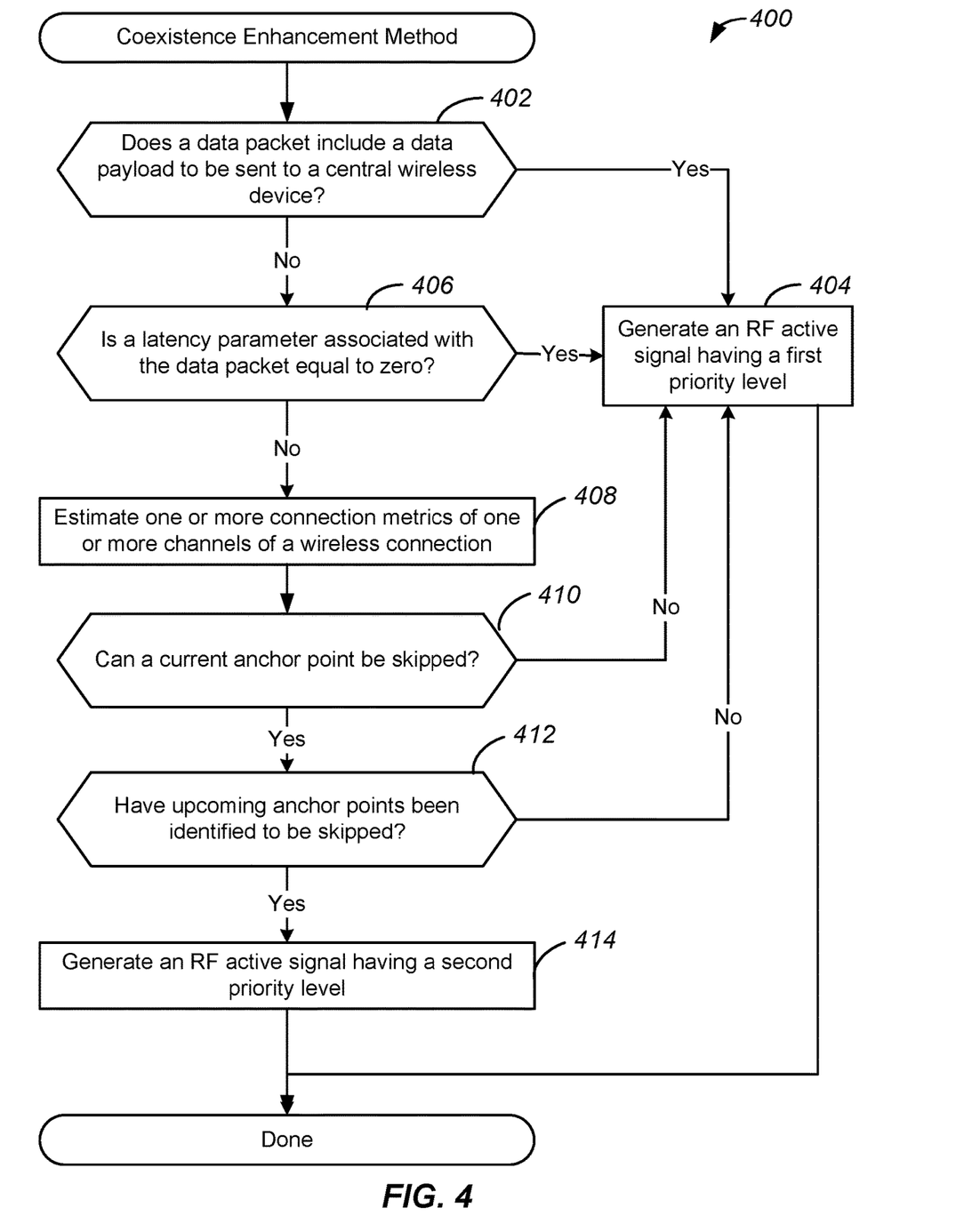
FIG. 4 illustrates an example of another method for coexistence enhancement, implemented in accordance with some embodiments.

FIG. 4 illustrates an example of another method for coexistence enhancement, implemented in accordance with some embodiments. As similarly discussed above, wireless devices may improve performance of collocated transceivers and improve coexistence between their respective communications operations. In some embodiments, a method, such as method 400, may be performed to use connection metrics and latency parameters to dynamically modify durations of medium access grants to respective transceivers. As will be discussed in greater detail below, connection metrics and estimated connection metrics may be leveraged to determine a number of anchor points that may be skipped thus enabling the dynamic medication of medium access grant durations.

Method 400 may perform operation 402 during which it may be determined if a data packet includes a data payload to be sent to a central wireless device. In this example, the wireless device may be a peripheral wireless device, such as a slave wireless device, in communication with a central wireless device, which may be a master wireless device. In various embodiments, such a determination may be made based on a bit identifying a status of a signal, such as an RF active signal used by a transceiver to request medium access. For example, a Bluetooth transceiver and associated processing logic included in the peripheral wireless device may have a data packet including a data payload to be transmitted, and may assert an RF active signal to request medium access. The assertion of the RF active signal may be conveyed via a dedicated bit priority line that may be used to infer that a data payload for transmission is present.

In another example, the determination of whether or not there is a data payload may be made based on one or more aspects of a data packet, such as a header. More specifically, the header may be used to identify a particular type of operation, such as a polling operation, and such a type of operation may be mapped to a determination of no data payload based on a predetermined mapping of operation types to data payload status. Accordingly, if it is determined that the data packet does include a data payload for transmission, method 400 may proceed to operation 404.

Method 400 may perform operation 404 during which an RF active signal having a first priority level may be generated. In various embodiments, the first priority level may be a high priority level. Accordingly, during operation 404, a priority level associated with the RF active signal may be set to high, and such a priority level may be interpreted by other components of the wireless device, such as a processing device, to grant medium access in accordance with standard coexistence operations.

Returning to operation 402, if it is determined that there is no data payload for transmission, method 400 may perform operation 406 during which it may be determined if there is a latency parameter, and if that latency parameter is equals zero. As similarly discussed above, a latency parameter may have been determined during connection establishment between the wireless device and another wireless device. Accordingly, the latency parameter may have been negotiated between the wireless devices in the communications link during connection establishment, and may be determined in accordance with a communications protocol.

In one example, the latency parameter may be defined, at least in part, by aspects of a specification of a wireless communications protocol. For example, the latency parameter may be defined by aspects of connection establishment set forth in a Bluetooth specification. More specifically, the Bluetooth specification identifies parameters that are negotiated during connection establishment, and one of those parameters may be a latency parameter that may be specified by a central device for the purposes of negotiating a connection interval. Accordingly, the latency parameter may be determined by the central device, and may be sent to a peripheral device. In another example, the latency parameter may be determined based on designated value that may have been set by an entity, such as a manufacturer, or by one or more operational conditions and/or parameters. The latency parameter may be stored as one or more data values in memory. Accordingly, during operation 406, the data values may be read from memory and used to determine if the latency parameter equals zero, and if method 400 should proceed to operation 404, as discussed above. If it is determined that the latency parameter does not equal zero, then method 400 may proceed to operation 408.

Method 400 may perform operation 408 during which one or more connection metrics may be estimated for one or more channels of the wireless connection. In various embodiments, the connection metrics may be metrics that represent one or more aspects of a signal quality associated with a particular communications channel used for the wireless connection. More specifically, a wireless connection may utilize multiple channels representing sub-bands of a communications medium. The wireless devices may cycle through channels for different transmit/receive operations. Accordingly, different anchor points may utilize different channels for communication.

In various embodiments, the peripheral wireless device may be store and maintain connection data associated with each of the channels. Such data may be stored within a data table in memory. For example, a communications medium may have 37 channels, and the peripheral wireless device may store data for each channel. Moreover, the peripheral wireless device may store data for a designated number of previous communications operations for each channel. For example, data associated with a previous five uses of a channel may be stored. Such a designated number may have been determined by an entity, such as a manufacturer. The stored data may identify a success rate as well as one or more other metrics, such as signal strength metric and/or a computed signal to noise ratio (SNR). In some embodiments, the success rate may identify how often the peripheral wireless device was able to successfully connect using that channel. Accordingly, the success rate may be determined by how many of the stored data points in the historical data for a channel were successful, and/or how many attempts were required for a particular transmit or receive operation. More specifically, successful connection attempts may be identified by receipt of acknowledgment messages, and such acknowledgment messages may be used to compute a successful connection rate based on a total number of connection attempts. In various embodiments, the success rate is determined based on the previously stored data, and is used as an estimated connection metric, and more specifically, an estimated success rate used for operations of method 400 discussed herein.

Method 400 may perform operation 410 during it may be determined if a current anchor point can be skipped. As similarly discussed above, anchor points define a periodic implementation of operations associated with one of the transceivers, such as polling operations performed by a second transceiver that is a Bluetooth transceiver. In various embodiments, a wireless device may identify, based on the latency parameter and one or more estimated connection metrics, whether or not a current anchor point may be skipped as well as a number of upcoming anchor points and associated polling operations that may be skipped.

More specifically, if the latency parameter is greater than zero, the wireless device may identify a number of anchor points based on the latency parameter. For example, the latency parameter may identify a number of consecutive connection events, such as transmit/receive operations, that were previously negotiated, as discussed above, and each connection event may have an associated anchor point. The peripheral wireless device may look at an estimated connection metric for each of the upcoming connection events based on the stored data discussed above as well as a channel assigned to each of the upcoming connection events. Accordingly, estimated connection metrics associated with channels to be used for anchor points included in the current RF active signal may be used to determine if a current anchor point may be skipped.

Moreover, the peripheral wireless device may look at a connection metric for an anchor point occurring just after those identified based on the latency parameter. If the peripheral wireless device determines that an estimated connection metric for the subsequent anchor point is below a designated threshold, that anchor point is identified as skipped, and another anchor point may be dynamically selected. For example, an anchor point immediately preceding the subpar anchor point may be used for transmit and receive operations. In this way, the peripheral wireless device may identify and skip connection events using subpar channels to dynamically modify a period defined, at least in part, by the latency parameter. Additional details regarding such dynamic modification are discussed in greater detail below with reference to FIG. 7. Thus, if it is determined that a current anchor point can't be skipped, method 400 may proceed to operation 404 discussed above. If it is determined that the current anchor point may be skipped, method 400 may proceed to operation 412.

Accordingly, method 400 may perform operation 412 during which it may be determined if upcoming anchor points have been identified to be skipped. As discussed above, upcoming anchor points may have been identified to be skipped. During operation 412, the peripheral wireless device may have arrived at the period of activity associated with the upcoming anchor points, and may generate an RF active signal in accordance with the previously described determination. If it is determined that the upcoming anchor points should not be skipped, method 400 may proceed to operation 404 discussed above. If it is determined that the upcoming anchor points should be skipped, method 400 may proceed to operation 414.

Accordingly, during operation 414, an RF active signal may be generated having a second priority level. In various embodiments, the second priority level may be a lower priority level. Accordingly, during operation 414, a priority level associated with the RF active signal may be set to low. In some embodiments, a low priority level may let the first transceiver, which may be a Wi-Fi transceiver, determine whether or not to grant medium access to the second transceiver. Such a determination may be made based on current activity of the first transceiver. For example, if the second transceiver is not active, it may grant medium access to the first transceiver. If the second transceiver is active, it may deny medium access to the first transceiver. In another example, for a high priority level, the second transceiver may grant medium access to the first transceiver regardless of activity of the second transceiver.

Figure 5:
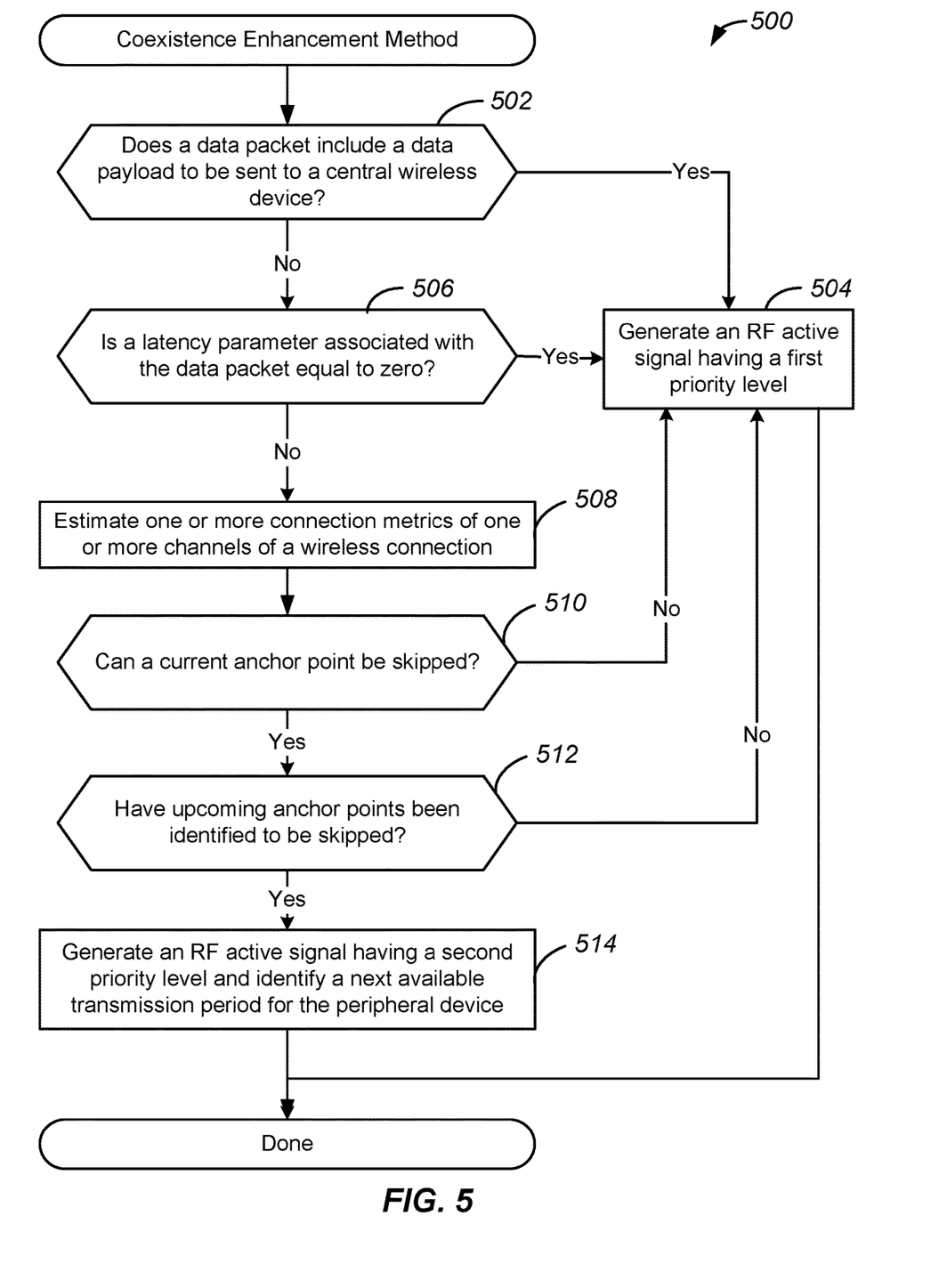
FIG. 5 illustrates an example of yet another method for coexistence enhancement, implemented in accordance with some embodiments.

FIG. 5 illustrates an example of yet another method for coexistence enhancement, implemented in accordance with some embodiments. As similarly discussed above, wireless devices may improve performance of collocated transceivers and improve coexistence between their respective communications operations. In some embodiments, a method, such as method 500, may be performed to use connection metrics and latency parameters to dynamically modify durations of medium access grants to respective transceivers. While methods, such as method 400 describe operations associated with a peripheral device transmitting data to a central device, a method, such as method 500 may be performed for a central device transmitting data to a peripheral device.

Method 500 may perform operation 502 during which it may be determined if a data packet includes a data payload to be sent to a peripheral wireless device. In this example, the wireless device may be a central wireless device, such as a master wireless device, in communication with a peripheral wireless device, which may be a slave wireless device. As similarly discussed above, such a determination may be made based on a bit identifying a status of a signal, such as an RF active signal used by a transceiver to request medium access. In another example, the determination of whether or not there is a data payload may be made based on one or more aspects of a data packet, such as a header.

Method 500 may perform operation 504 during which an RF active signal having a first priority level may be generated. As similarly discussed above, the first priority level may be a high priority level. Accordingly, during operation 504, a priority level associated with the RF active signal may be set to high, and such a priority level may be interpreted by other components of the wireless device, such as a processing device, to grant medium access in accordance with standard coexistence operations.

Returning to operation 502, if it is determined that there is no data payload for transmission, method 500 may perform operation 506 during which it may be determined if there is a latency parameter, and if that latency parameter is equals zero. As similarly discussed above, a latency parameter may have been determined during connection establishment between the wireless device and another wireless device. Accordingly, the latency parameter may have been negotiated between the wireless devices in the communications link during connection establishment, and may be determined in accordance with a communications protocol, such as a Bluetooth protocol. In this way, the latency parameter may be determined by the central device, and may be stored in memory. Thus, during operation 506, the data values may be read from memory and used to determine if the latency parameter equals zero, and if method 500 should proceed to operation 504, as discussed above. If it is determined that the latency parameter does not equal zero, then method 500 may proceed to operation 508.

Method 500 may perform operation 508 during which one or more connection metrics may be estimated for one or more channels of the wireless connection. In various embodiments, the connection metrics may be metrics that represent one or more aspects of a signal quality associated with a particular communications channel used for the wireless connection. As similarly discussed above, the connection metrics may include a success rate that is determined based on previously stored data, and is used as an estimated connection metric, and more specifically, an estimated success rate used for operations of method 500 disclosed herein.

Method 500 may perform operation 510 during which it may be determined if a current anchor point may be skipped. As similarly discussed above, anchor points define a periodic implementation of operations associated with one of the transceivers, such as polling operations performed by a second transceiver that is a Bluetooth transceiver. In various embodiments, the central wireless device may identify, based on the latency parameter and one or more estimated connection metrics, a number of anchor points and associated polling operations that may be skipped. As discussed above, the number of anchor points may be dynamically modified based on the one or more estimated connection metrics.

Moreover, the central device may use estimated connection metrics associated with channels to be used for anchor points included in the current RF active signal to determine if a current anchor point may be skipped. If it is determined that a current anchor point can't be skipped, method 500 may proceed to operation 504 discussed above. If it is determined that a current anchor point can be skipped, method 500 may proceed to operation 512.

Accordingly, method 500 may perform operation 512 during which it may be determined if upcoming anchor points have been identified to be skipped. As discussed above, upcoming anchor points may have been identified to be skipped. During operation 512, the central wireless device may have arrived at the period of activity associated with the upcoming anchor points, and may generate an RF active signal in accordance with the previously described determination. If it is determined that the upcoming anchor points should not be skipped, method 500 may proceed to operation 504 discussed above. If it is determined that the upcoming anchor points should be skipped, method 500 may proceed to operation 514.

Accordingly, during operation 514, an RF active signal may be generated having a second priority level. In various embodiments, the second priority level may be a lower priority level. Accordingly, during operation 514, a priority level associated with the RF active signal may be set to low. Moreover, during operation 514, a next available transmission period may be identified for a peripheral device. In some embodiments, the next available transmission period may be selected such that it does not occur during one of the skipped anchor points. In this way, the central device may schedule activity of the peripheral device based, at least in part, on the identification of the skipped anchor points.

Figure 6:
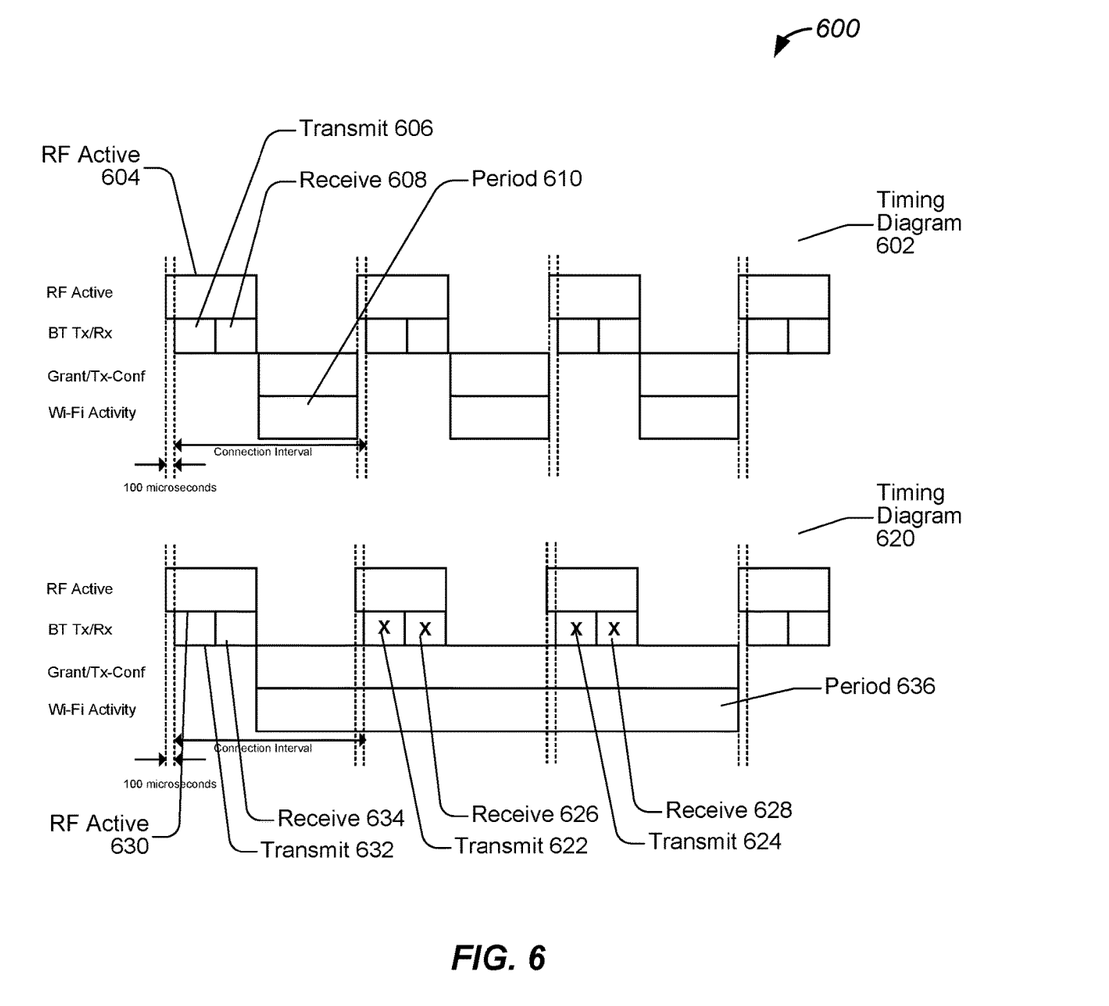
FIG. 6 illustrates an example of timing diagrams for coexistence enhancement, implemented in accordance with some embodiments.

FIG. 6 illustrates an example of timing diagrams for coexistence enhancement, implemented in accordance with some embodiments. As shown in diagram 600, two timing diagrams are illustrated. More specifically, timing diagram 602 illustrates an example where a latency parameter is "0". When an RF active signal, such as RF active signal 604, is asserted and has a high priority level, medium access is granted to the Bluetooth transceiver for transmit operation 606 and receive operation 608. Access is then returned to the Wi-Fi transceiver for period 610 of activity. As shown in timing diagram 602, this is repeated for each anchor point, as identified by assertions of the RF active signal.

Moreover, timing diagram 620 illustrates an example where a latency parameter is "2". Accordingly, two anchor points have been identified as potentially being skipped. In this example, transmit operations 622 and 624 as well as receive operations 626 and 628 have been identified as to be skipped as they fall within the number of anchor points identified by the latency parameter. Thus, initially, RF active signal 630 is asserted and has a high priority level, and medium access is granted to the Bluetooth transceiver for transmit operation 632 and receive operation 634. Access is then returned to the Wi-Fi transceiver for period 636 of activity. As shown in timing diagram 620, the next two anchor points are skipped, as determined based on the latency parameter, and access to the communications medium is retained at the Wi-Fi transceiver. As is apparent from timing diagram 620, the amount of time granted to the Wi-Fi transceiver is increased, and unnecessary transmit operations 622 and 624 and receive operations 626 and 628 have been avoided. In this way, efficiency of the usage of the communications medium is increased, and power consumption is reduced due to a reduction in a number of transmit and receive operations performed by the Bluetooth transceiver.

Figure 7:
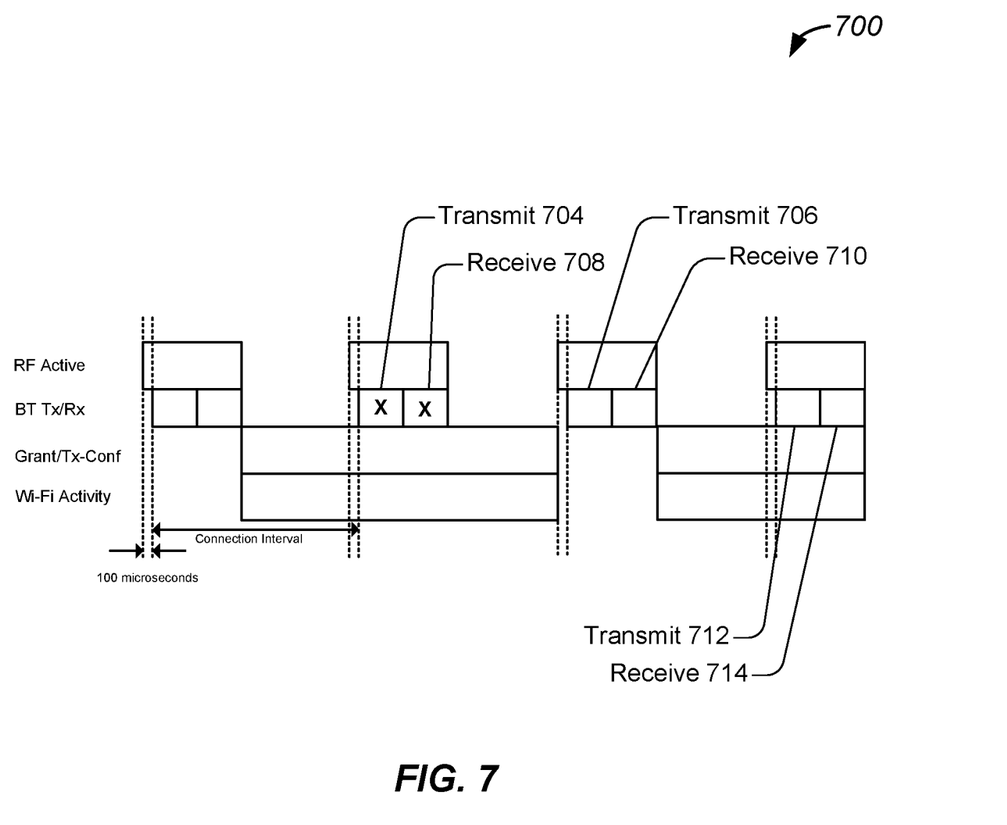
FIG. 7 illustrates an example of another timing diagram for coexistence enhancement, implemented in accordance with some embodiments.

FIG. 7 illustrates an example of another timing diagram for coexistence enhancement, implemented in accordance with some embodiments. As similarly discussed above, timing diagram 700 illustrates an example where a latency parameter is "2". Accordingly, two anchor points have been identified as potentially being skipped. For example, transmit operations 704 and 706 as well as receive operations 708 and 710 may initially have been identified to be skipped as they fall within the number of anchor points identified by the latency parameter. However, in this example, a connection metric associated with a channel used for subsequent connection events, such as transmit operation 712 and receive operation 714, may have been identified as being below a designated threshold. Based on this determination, the determination of which anchor points are skipped may be dynamically modified such that transmit operation 706 and receive operation 710 are now not skipped, and transmit operation 712 and receive operation 714 are skipped. Thus, the connection metrics may be used to dynamically modify the determination of skipped anchor points based on connection metrics associated with those anchor points. In this way, connection integrity may be maintained and latency issues may be avoided.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   determining, using a processing device, a latency parameter associated with a wireless device comprising a first transceiver compatible with a first communications protocol and a second transceiver compatible with a second communications protocol and collocated with the first transceiver within the wireless device, wherein the latency parameter is determined based on whether or not a received data transmission includes a data payload;
   identifying, using the processing device, a number of anchor points based, at least in part, on the latency parameter, each of the anchor points representing a periodic connection event for the second transceiver; and
   updating a radio frequency (RF) active signal of the wireless device to skip at least one transmit operation and receive operation of the second transceiver based on the identified number of anchor points.

2. The method of claim 1 further comprising:
   generating a plurality of connection metrics for a plurality of channels included in a communications medium shared by the first transceiver and the second transceiver.

3. The method of claim 2, wherein the generating further comprises:
   storing previous connection data for each of the plurality of channels; and
   determining a connection success rate for each of the plurality of channels based on the previous connection data.

4. The method of claim 2 further comprising:
   updating the identified number of anchor points based on at least one of the plurality of connection metrics.

5. The method of claim 4, wherein the updating further comprises:
   determining an additional anchor point uses a connection having a connection metric value less than a designated threshold value, the anchor point being assigned to a communications event subsequent to the identified number of anchor points; and
   selecting, for the communications event, a preceding anchor point and skipping the additional anchor point, the preceding anchor point using a connection having a connection metric value greater than the designated threshold value.

6. The method of claim 1, wherein the latency parameter identifies a priority level associated with the RF active signal.

7. The method of claim 1, wherein the latency parameter is determined during a communications link establishment operation.

8. The method of claim 1, wherein the first communications protocol is a Wi-Fi protocol, and wherein the second communications protocol is a Bluetooth protocol.

9. The method of claim 8, wherein the Bluetooth protocol is a Bluetooth Low Energy protocol.

10. A device comprising:
    a memory configured to store connection data associated with a plurality of channels of a communications medium shared by a first transceiver collocated with a second transceiver within a wireless device; and processing elements configured to:
  determine a latency parameter associated with the first transceiver and the second transceiver based on whether or not a received data transmission includes a data payload;
  identify a number of anchor points based, at least in part, on the latency parameter, each of the anchor points representing a periodic connection event for the second transceiver; and
  update a radio frequency (RF) active signal to skip at least one transmit operation and receive operation of the second transceiver based on the identified number of anchor points.

11. The device of claim 10, wherein the processing elements are further configured to:
  generate a plurality of connection metrics for a plurality of channels included in the communications medium shared by the first transceiver and the second transceiver.

12. The device of claim 11, wherein the processing elements are further configured to:
  retrieve previous connection data for each of the plurality of channels; and
  determine a connection success rate for each of the plurality of channels based on the previous connection data.

13. The device of claim 11, wherein the processing elements are further configured to:
  update the identified number of anchor points based on at least one of the plurality of connection metrics.

14. The device of claim 13, wherein the processing elements are further configured to:
  determine an additional anchor point uses a connection having a connection metric value less than a designated threshold value, the anchor point being assigned to a communications event subsequent to the identified number of anchor points; and
  select, for the communications event, a preceding anchor point and skipping the additional anchor point, the preceding anchor point using a connection having a connection metric value greater than the designated threshold value.

15. The device of claim 10, wherein the first transceiver is compatible with a Wi-Fi protocol, and wherein the second transceiver is compatible with a Bluetooth protocol.

16. A system comprising:
  an antenna configured to transmit and receive wireless signals;
  a first transceiver coupled to the antenna;
  a second transceiver coupled to the antenna and collocated with the first transceiver;
  a memory configured to store connection data associated with a plurality of channels of a communications medium shared by the first transceiver and the second transceiver; and
  processing elements configured to:
    determine a latency parameter associated with the first transceiver and the second transceiver based on whether or not a received data transmission includes a data payload;
    identify a number of anchor points based, at least in part, on the latency parameter, each of the anchor points representing a periodic connection event for the second transceiver; and
    update a radio frequency (RF) active signal to skip at least one transmit operation and receive operation of the second transceiver based on the identified number of anchor points.

17. The system of claim 16, wherein the processing elements are further configured to:
  generate a plurality of connection metrics for a plurality of channels included in the communications medium shared by the first transceiver and the second transceiver.

18. The system of claim 17, wherein the processing elements are further configured to:
  retrieve previous connection data for each of the plurality of channels; and
  determine a connection success rate for each of the plurality of channels based on the previous connection data.

19. The system of claim 17, wherein the processing elements are further configured to:
  update the identified number of anchor points based on at least one of the plurality of connection metrics.

20. The system of claim 19, wherein the processing elements are further configured to:
  determine an additional anchor point uses a connection having a connection metric value less than a designated threshold value, the anchor point being assigned to a communications event subsequent to the identified number of anchor points; and
  select, for the communications event, a preceding anchor point and skipping the additional anchor point, the preceding anchor point using a connection having a connection metric value greater than the designated threshold value.

* * * * *